US012522014B2

(12) United States Patent
Bouchet

(10) Patent No.: US 12,522,014 B2
(45) Date of Patent: Jan. 13, 2026

(54) BRASS ALLOY FOR WRITING INSTRUMENT TIPS

(71) Applicant: SOCIÉTÉ BIC, Clichy (FR)

(72) Inventor: Julien Bouchet, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 328 days.

(21) Appl. No.: 18/245,740

(22) PCT Filed: Sep. 16, 2021

(86) PCT No.: PCT/EP2021/075549

§ 371 (c)(1),
(2) Date: Mar. 17, 2023

(87) PCT Pub. No.: WO2022/058466

PCT Pub. Date: Mar. 24, 2022

(65) Prior Publication Data

US 2023/0373235 A1 Nov. 23, 2023

(30) Foreign Application Priority Data

Sep. 17, 2020 (EP) .................................... 20315411

(51) Int. Cl.
*B43K 1/00* (2006.01)
*C22C 1/02* (2006.01)
(Continued)

(52) U.S. Cl.
CPC .................. *B43K 1/00* (2013.01); *C22C 1/02* (2013.01); *C22C 9/04* (2013.01); *C22F 1/08* (2013.01)

(58) Field of Classification Search
CPC .. B43K 1/00; B43K 1/082; B43K 1/10; C22C 1/02; C22C 9/04; C22F 1/08
See application file for complete search history.

(56) References Cited

U.S. PATENT DOCUMENTS

| | | | | |
|---|---|---|---|---|
| 2005/0039827 | A1* | 2/2005 | Yamagishi | C22C 9/04 420/476 |
| 2006/0065336 | A1 | 3/2006 | Gillieron et al. | |

(Continued)

FOREIGN PATENT DOCUMENTS

| | | | |
|---|---|---|---|
| DE | 102009021336 | A1 | 11/2010 |
| DE | 102009038657 | A1 | 2/2011 |

(Continued)

OTHER PUBLICATIONS

WO-2012081595-A1, machine translation. (Year: 2012).*
(Continued)

*Primary Examiner* — John A Hevey
(74) *Attorney, Agent, or Firm* — Bookoff McAndrews, PLLC

(57) ABSTRACT

A tip for a handheld writing instrument-includes a brass alloy comprising the following composition: Cu in an amount of from about 52 wt.-% to about 62 wt.-%, Sn in an amount of from about 0.1 wt.-% to about 1.0 wt.-%, Fe in an amount of from about 0.1 wt.-% to about 1.0 wt.-%, Si in an amount of from about 0.05 wt.-% to about 0.5 wt.-%, Ni in an amount of from about 0.05 wt.-% to about 0.5 wt.-%, Pb if present, in an amount of less than about 0.05 wt.-%, optionally other elements in a total amount of less than about 3 wt.-% (impurities), and Zn as balance.

15 Claims, 2 Drawing Sheets

(51) Int. Cl.

| | |
|---|---|
| ***C22C 9/04*** | (2006.01) |
| ***C22F 1/08*** | (2006.01) |

(56) References Cited

U.S. PATENT DOCUMENTS

| | | | | |
|---|---|---|---|---|
| 2014/0294665 | A1 | 10/2014 | Torre et al. | |
| 2016/0040269 | A1* | 2/2016 | Huettner | C22C 9/04 401/215 |
| 2016/0068931 | A1* | 3/2016 | Xu | C22C 9/04 420/471 |
| 2018/0291484 | A1 | 10/2018 | Hüttner et al. | |
| 2020/0370147 | A1* | 11/2020 | Plett | C22C 9/04 |

FOREIGN PATENT DOCUMENTS

| | | | | |
|---|---|---|---|---|
| DE | 102015212937 | A1 | 1/2017 | |
| JP | 2001011595 | A * | 1/2001 | |
| WO | WO-2012081595 | A1 * | 6/2012 | B43K 1/08 |

OTHER PUBLICATIONS

JP-2001011595-A, machine translation. (Year: 2001).*
International Search Report and Written Opinion issued in International Application No. PCT/EP2021/075549 on Dec. 9, 2021 (9 pages).

* cited by examiner

BRASS ALLOY FOR WRITING INSTRUMENT TIPS

CROSS-REFERENCE TO RELATED APPLICATIONS

This patent application is a national stage entry of International Application No. PCT/EP2021/075549, filed on Sep. 16, 2021, published as WO 2022/058466 A1, which claims the benefit of priority to European Application No. 20315411.7, filed on Sep. 17, 2020.

TECHNICAL FIELD

The present disclosure relates to a tip, more specifically a writing tip, for a handheld writing instrument which comprises a novel brass alloy, to a handheld writing instrument comprising the tip, as well as to various uses and processes of preparation involving such products.

BACKGROUND OF THE DISCLOSURE

Writing tips of writing instruments such as a pen are mass-produced in large scale with annual production exceeding tens of billion tips and pens. As such, the machinability of the alloy used for producing the tip and the associated production time are of paramount concern to ensure cost-effective production.

Typical brass writing tips may comprise lead (Pb) in an amount of about 2.0 wt.-% which is dispersed in and precipitates as isolated phases. The heat generated by strong frictional forces of cutting and/or drilling tools during machining can melt such lead precipitates and results in a lubricating effect, which improves cutting performance and precision and the service life of the cutting tools. Thus, it is, in principle, an ideal element for providing a brass alloy having good machinability at high machining speeds. Unfortunately lead used for improving machinability of brass has a negative effect on environment and human health. Lead is a highly poisonous metal, affecting almost every organ and system in the body.

The present disclosure is concerned with providing a brass alloy which has a reduced amount of lead or is substantially free of lead while providing good machinability at a high machining speed so that the alloy is suitable for use in mass-producing tips for writing instruments.

SUMMARY OF THE DISCLOSURE

The present inventors have surprisingly found that lead (Pb) can be almost dispensed with by providing an alloy having a relatively high amounts of β-phases and replacing part or all of Pb with a surprisingly small amount of Sn, Fe, Ni and Si. These elements were found to favorably contribute to good corrosion resistance and mechanical properties for ensuring processability to the writing instruments' tips.

Consequently, in a first aspect, the present disclosure relates to a tip for a handheld writing instrument. The tip comprises a brass alloy. The brass alloy may comprise Cu in an amount of from about 52 wt.-% to about 62 wt.-%. The brass alloy may comprise Sn in an amount of from about 0.10 wt.-% to about 1.0 wt.-%. The brass alloy may comprise Fe in an amount of from about 0.10 wt.-% to about 1.0 wt.-%. The brass alloy may comprise Si in an amount of from about 0.05 wt.-% to about 0.5 wt.-%. The brass alloy may comprise of Ni in an amount of from about 0.05 wt.-% to about 0.5 wt.-%. In some embodiments, the brass alloy may comprise Pb. However, in these cases, the amount of Pb should be kept low. In some embodiments, the brass alloy may not comprise Pb except as unavoidable impurity, for instance in amounts of less than about 0.005 wt.-%. The brass alloy may optionally also comprise a minor amount of Pb, for instance less than about 0.05 wt.-%. The brass alloy may comprise Zn as balance.

In some embodiments, the brass alloy may consist or consist essentially of the aforementioned elements. In some embodiments, the brass alloy may consist of the aforementioned elements and optionally further elements in a total amount of less than about 3.0 wt.-%, more specifically less than about 2.0 wt.-% and in particular less than about 1.0 wt.-%. These other elements may be impurities, such as impurities introduced in the production on a commercial scale, or purposefully added to e.g. modulate performance of the alloy. Zn is used to provide the balance.

In some embodiments, the brass alloy may comprise the following elements: Cu in an amount of from about 54 wt.-% to about 60 wt.-%; Sn in an amount of from about 0.15 wt.-% to about 0.5 wt.-%; Fe in an amount of from about 0.15 wt.-% to about 0.5 wt.-%; Si in an amount of from about 0.07 wt.-% to about 0.20 wt.-%; and Ni in an amount of from about 0.10 wt.-% to about 0.30 wt.-%.

In some embodiments, it may be particularly advantageous that the brass alloy comprises the following elements: Cu in an amount of from about 56 wt.-% to about 58 wt.-%; Sn in an amount of from about 0.25 wt.-% to about 0.35 wt.-%; Fe in an amount of from about 0.20 wt.-% to about 0.3 wt.-%; Si in an amount of from about 0.08 wt.-% to about 0.12 wt.-%; Ni in an amount of from about 0.15 wt.-% to about 0.25 wt.-%.

In some embodiments, the brass alloy may be advantageous that the brass alloy comprises less than about 0.03 wt.-% Pb, more specifically less than about 0.01 wt.-% Pb. In some embodiments, the brass alloy may be substantially free of or free of Pb.

In some embodiments, the brass alloy may further comprise one or more of the following elements in the following amounts: Bi in an amount of about 0.05 wt.-% to about 0.7 wt.-%; Te in an amount of about 0.05 wt.-% to about 0.20 wt.-%; Se in an amount of about 0.05 wt.-% to about 0.20 wt.-%. It should be understood that the alloy may comprise or contain one or more, two or more, or three of the aforementioned elements, in any combination. In some embodiments, it may be particularly advantageous that the alloy comprises Bi in an amount of about 0.05 wt.-% to about 0.7 wt.-%, more specifically about 0.10 wt.-% to about 0.50 wt.-%, and in particular about 0.15 wt.-% to about 0.30 wt.-%. The presence of Bi is believed to provide low-melting Bi-containing precipitates at grain boundaries which provide an intra-alloy lubricating effect during machining.

As indicated above, Zn is used as balance. In some embodiments, it may be advantageous that the brass alloy contains at least about 35 wt.-% Zn, more specifically at least about 39 wt.-%, and in particular between about 40 wt.-% and about 44 wt.-%.

In some embodiments, the brass alloy may be characterized by a microstructure comprising acicular α-phases and acicular β-phases. The microstructure may be determined from a cross-sectional cut of the tip. It should be understood that the cutting plane is not particularly limited and that any cut through the tip body should be considered as a cross-sectional cut.

In some embodiments, the microstructure may comprise domains in which a plurality of α-phases and a plurality of β-phases are alternatingly arranged. Additionally or alternatively, in some embodiments, the microstructure may comprise domain in which the α-phases and/or the β-phases have an aspect ratio of at least about 5, more specifically of at least about 10, and in particular at least about 15. Additionally or alternatively, in some embodiments, the α-phases and/or the β-phases may have a length of at least about 50 μm, more specifically at least about 75 μm, and in particular at least about 100 μm. Additionally or alternatively, in some embodiments, the β-phases of the microstructure may occupy about 20 to about 55% by area, more specifically about 25 to about 40% by area, and in particular about 30 to about 45% by area. Additionally or alternatively, in some embodiments, the second β-phases may be uniformly dispersed in the microstructure. Additionally or alternatively, in some embodiments, the microstructure may comprise precipitates, in particular precipitates which accumulate at the phase boundaries of the β-phases.

In a second aspect, the present disclosure relates to a handheld writing instrument for dispensing a solvent writing ink. The handheld writing instrument may comprise a tubular body and a tip. The tip may comprise a brass alloy as defined in any one of the embodiments for the first aspect of the present disclosure. The tip may be adapted to be coupled to the tubular body.

In a third aspect, the present disclosure relates to a process for preparing a tip according to the first aspect of the present disclosure. The process may comprise melt mixing a composition comprising the elements in amounts as indicated for the brass alloy according to the first aspect of the present disclosure. The process may further comprise extruding the melt to a solid body. The process may further comprise processing the solid body to a tip. In some embodiments, the composition and/or the properties of the obtained brass alloy may be defined as indicated above for the first aspect of the present disclosure.

In a fourth aspect, the present disclosure relates to the use of a brass alloy for preparing a tip for a handheld writing instrument. The brass alloy may be defined as indicated above for the first aspect of the present disclosure.

DETAILED DESCRIPTION OF THE DISCLOSURE

Figure 1:
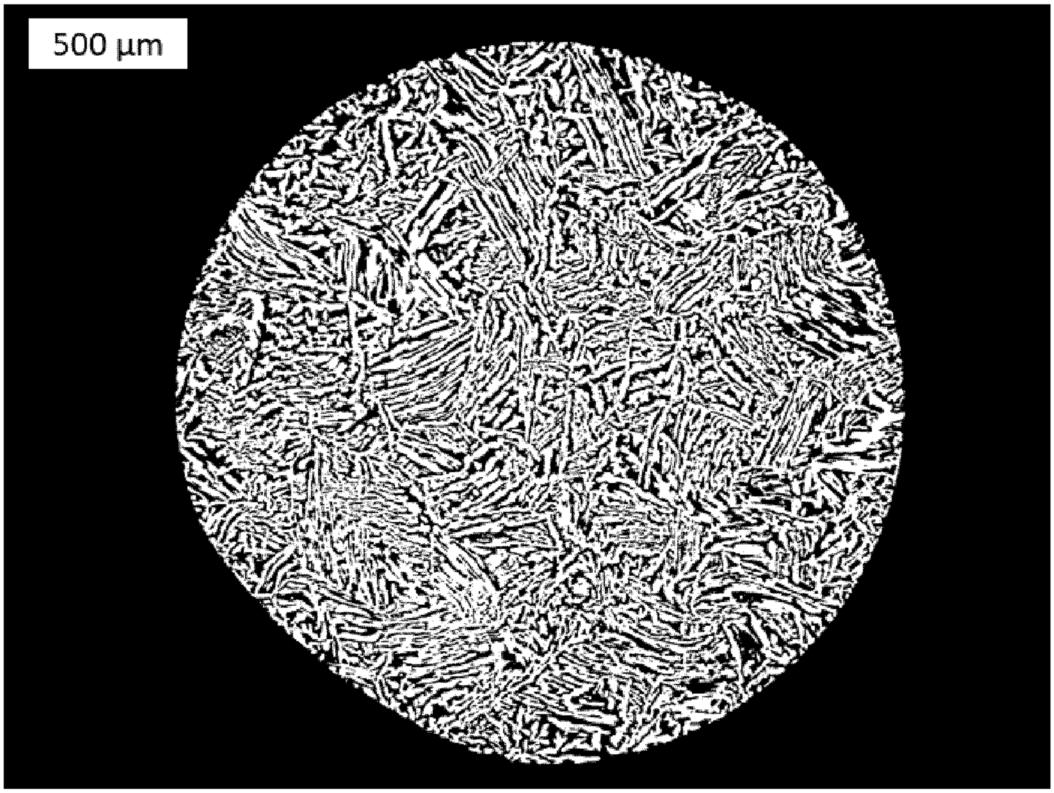
FIG. 1 shows an etched image of the microstructure of the brass alloy.

Hereinafter, a detailed description will be given of the present disclosure. The terms or words used in the description and the claims of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

As indicated above, the present inventors have surprisingly found that lead (Pb) can be almost dispensed with by providing an alloy having a relatively high amount of β-phases and replacing part or all of Pb with a surprisingly small amount of Si. Further additions of Sn, Fe, and Ni were found to favorably contribute to good corrosion resistance and mechanical properties for ensuring processability to the writing instruments' tips.

Consequently, in a first aspect, the present disclosure relates to a tip for a handheld writing instrument. The tip comprises a brass alloy. The brass alloy may comprise Cu in an amount of from about 52 wt.-% to about 62 wt.-%. The brass alloy may comprise Sn in an amount of from about 0.10 wt.-% to about 1.0 wt.-%. The brass alloy may comprise Fe in an amount of from about 0.10 wt.-% to about 1.0 wt.-%. The brass alloy may comprise Si in an amount of from about 0.05 wt.-% to about 0.50 wt.-%. The brass alloy may comprise of Ni in an amount of from about 0.05 wt.-% to about 0.50 wt.-%. In some embodiments, the brass alloy may comprise Pb. However, in these cases, the amount of Pb should be kept low. In some embodiments, the brass alloy may not comprise Pb except as unavoidable impurity, for instance in amounts of less than about 0.005 wt.-%. The brass alloy may optionally also comprise a minor amount of Pb, for instance less than about 0.05 wt.-%. The brass alloy may comprise Zn as balance.

Without wishing to be bound by theory, the beneficial properties of the present brass alloy may be attributed to the following:

First, it is believed that the brass alloy comprising Cu in an amount of from about 52 wt.-% to about 62 wt.-% may, in context of an alloy having the aforementioned amounts of Si and Pb, favorably contribute to the formation of a high amount of β-phases in relation to the amount of α-phases. The β-phases in brass possess a body-centered cubic (bcc) lattice structure, are relatively brittle and, thus, and are much harder and less formable at room temperature than the α-phases. The α-phases in brass possess a face-centered cubic (fcc) lattice structure and possess low hardness and high ductility. Thus, the relatively high amounts of β-phases may have a positive effect on machinability by promoting chip fragmentation of the material.

Second, using Si in an amount of from about 0.05 wt.-% to about 0.50 wt.-% is believed to contribute to β-phase formation and a decrease of α-phase formation. Although such effects have been described for Si for amounts of 3-4 wt.-%, it was surprisingly found that, for the purposes of the present disclosure, such effects can already be sufficiently realized with much lower amounts starting at about 0.10 wt.-%.

Third, using Sn in an amount of from about 0.10 wt.-% to about 1.0 wt.-% is believed to contribute to corrosion resistance, in particular by decreasing dezincification. Using Ni in an amount of from about 0.05 wt.-% to about 0.5 wt.-% is believed to further contribute to the corrosion resistance.

Fourth, using Fe in an amount of from about 0.10 wt.-% to about 1.0 wt.-% is believed to contribute to the mechanical properties for ensuring processability of the alloy to tips in a mass-production setting.

In some embodiments, the brass alloy may consist or consist essentially of the aforementioned elements. In some embodiments, the brass alloy may consist of the aforementioned elements and optionally further elements in a total amount of less than about 3.0 wt.-%, more specifically less than about 2.0 wt.-% and in particular less than about 1.0 wt.-%. These other elements may be impurities, such as impurities introduced in the production on a commercial scale, or purposefully added to e.g. modulate performance of the alloy. Zn is used to provide the balance.

In some embodiments, the brass alloy may comprise the following elements: Cu in an amount of from about 54 wt.-% to about 60 wt.-%; Sn in an amount of from about 0.15 wt.-% to about 0.50 wt.-%; Fe in an amount of from about 0.15 wt.-% to about 0.50 wt.-%; Si in an amount of from about 0.07 wt.-% to about 0.20 wt.-%; and Ni in an amount of from about 0.10 wt.-% to about 0.30 wt.-%.

In some embodiments, it may be particularly advantageous that the brass alloy comprises the following elements: Cu in an amount of from about 56 wt.-% to about 58 wt.-%; Sn in an amount of from about 0.25 wt.-% to about 0.35 wt.-%; Fe in an amount of from about 0.20 wt.-% to about 0.30 wt.-%; Si in an amount of from about 0.08 wt.-% to about 0.12 wt.-%; Ni in an amount of from about 0.15 wt.-% to about 0.25 wt.-%.

In some embodiments, the brass alloy may be advantageous that the brass alloy comprises less than about 0.03 wt.-% Pb, more specifically less than about 0.01 wt.-% Pb. In some embodiments, the brass alloy may be substantially free of or free of Pb.

In some embodiments, the brass alloy may further comprise one or more of the following elements in the following amounts: Bi in an amount of about 0.05 wt.-% to about 0.70 wt.-%; Te in an amount of about 0.05 wt.-% to about 0.20 wt.-%; Se in an amount of about 0.05 wt.-% to about 0.20 wt.-%. It should be understood that the alloy may comprise or contain one or more, two or more, or three of the aforementioned elements, in any combination. In some embodiments, it may be particularly advantageous that the alloy comprises Bi in an amount of about 0.05 wt.-% to about 0.70 wt.-%, more specifically about 0.10 wt.-% to about 0.50 wt.-%, and in particular about 0.15 wt.-% to about 0.30 wt.-%. The presence of Bi is believed to provide low-melting Bi-containing precipitates at grain boundaries which provide an intra-alloy lubricating effect during machining.

In some embodiments, the brass alloy may further comprise graphite in an amount of from about 0.05 wt.-% to about 0.70 wt.-%, in particular from about 0.10 wt.-% to about 0.50 wt.-%, to further provide an intra-alloy lubricating effect during machining.

As indicated above, Zn is used as balance. In some embodiments, it may be advantageous that the brass alloy contains at least about 35 wt.-% Zn, more specifically at least about 39 wt.-%, and in particular between about 40 wt.-% and about 44 wt.-%.

In some embodiments, it may be particularly advantageous that the brass alloy consists of the following elements in the following amounts:

Cu: Cu in an amount of from about 54 wt.-% to about 60 wt.-%, in particular from about 56 wt.-% to about 58 wt.-%;

Sn: in an amount of from about 0.10 wt.-% to about 1.0 wt.-%, in particular from about 0.25 wt.-% to about 0.35 wt.-%;

Fe: in an amount of from about 0.10 wt.-% to about 1.0 wt.-%, in particular from about 0.20 wt.-% to about 0.30 wt.-%;

Si: in an amount of from about 0.05 wt.-% to about 0.5 wt.-%, in particular from about 0.08 wt.-% to about 0.12 wt.-%;

Ni: in an amount of from about 0.05 wt.-% to about 0.5 wt.-%, in particular from about 0.15 wt.-% to about 0.25 wt.-%;

Pb: if present, in an amount of less than about 0.05 wt.-%;

Bi: if present, in an amount of about 0.05 wt.-% to about 0.70 wt.-%;

Te: if present, in an amount of about 0.05 wt.-% to about 0.20 wt.-%;

Se: if present, in an amount of about 0.05 wt.-% to about 0.20 wt.-%;

graphite: if present, in an amount of from about 0.05 wt.-% to about 0.70 wt.-%, in particular from about 0.10 wt.-% to about 0.50 wt.-%:

optionally other elements in a total amount of less than about 2 wt.-%, more specifically less than about 1 wt.-% and in particular less than about 0.5 wt.-% (impurities); and Zn: as balance.

In some embodiments, the brass alloy may be characterized by a microstructure comprising acicular α-phases and acicular β-phases. The microstructure may be determined from a cross-sectional cut of the tip. It should be understood that the cutting plane is not particularly limited and that any cut through the tip body should be considered as a cross-sectional cut. The methods for determining α-phases and β-phases in a cross-sectional cut are not particularly limited and include quantitative low-energy electron diffraction (LEED). Likewise, the analysis of optical features of the phases is not particularly limited and includes computer-assisted image analysis. Acicular morphologies are well-known to the skilled person and can be readily determined. For the purposes of the present application, an α-phase or β-phase may be considered as acicular in particular if the length of its overall longest dimension is at least three times the length of the longest dimension in the direction perpendicular to said overall longest dimension. Additionally or alternatively, an α-phase or β-phase may be considered as acicular if the ratio of the phase's width to its height is greater than 3.

Additionally or alternatively, in some embodiments, the microstructure may comprise domain in which the α-phases and/or the β-phases have an aspect ratio of at least about 5, more specifically of at least about 10, and in particular at least about 15.

Additionally or alternatively, in some embodiments, the α-phases and/or the β-phases may have a length of at least about 50 μm, more specifically at least about 75 μm, and in particular at least about 100 μm. The determination of the length of α-phases and β-phases is not particularly limited and can be determined by computer-assisted image analysis.

Figure 2A:
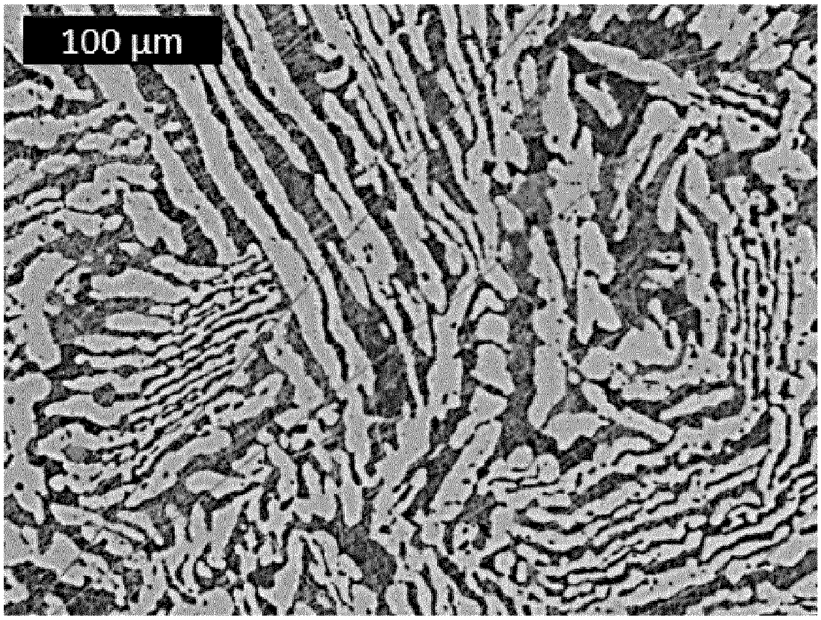
FIGS. 2A and 2B show detailed etched images of the microstructure of the brass alloy.
Figure 2B:
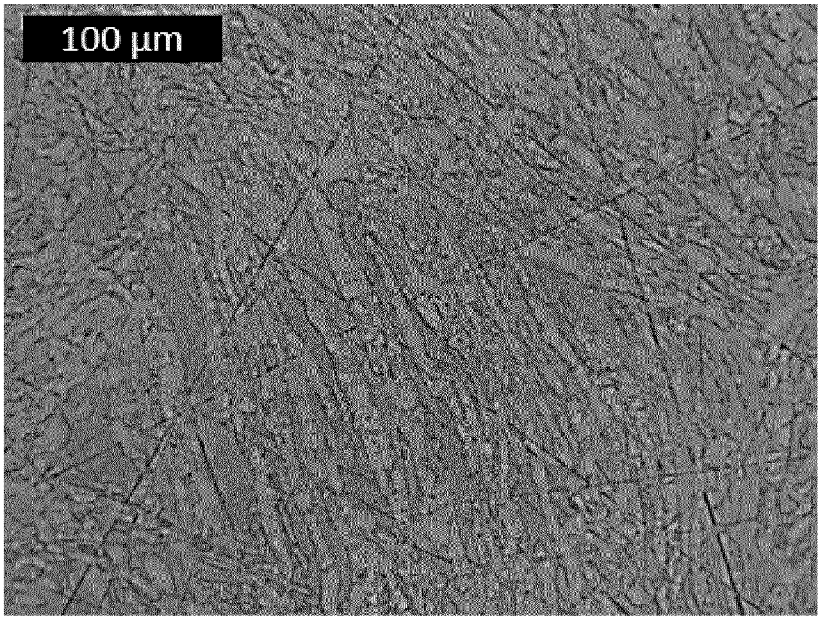

In some embodiments, the microstructure may comprise domains in which a plurality of α-phases and a plurality of β-phases are alternatingly arranged. Such an arrangement is shown in FIGS. 1 and 2A and 2B where domains (i.e. areas within the cross-sectional cut) are evident which may be characterized as an alternating arrangement of a plurality of α-phases and a plurality of β-phases. In some embodiments, such domains may be characterized by m α-phases and n β-phases which are alternatingly arranged wherein m and n are integers independently selected from: at least 3, at least 4, at least 5 or at least 6. Due to alternating arrangement of the α- and β-phases, m and n must meet the relationship: $m=n\pm2$.

Additionally or alternatively, in some embodiments, the β-phases of the microstructure may occupy about 20 to about 55% by area, more specifically about 25 to about 40% by area, and in particular about 30 to about 45% by area. Determination of the % occupied area can be conveniently carried out by computer-assisted analysis, but is not limited thereto.

Additionally or alternatively, in some embodiments, the second β-phases may be uniformly dispersed in the microstructure.

Additionally or alternatively, in some embodiments, the microstructure may comprise precipitates, in particular precipitates which accumulate at the phase boundaries of the β-phases. The precipitates may comprise or contain Bi, Te, Se, Sn, Fe, Si and/or Ni. It should be understood that the precipitates may comprise or contain one or more, two or more, three or more, four or more, five or more, six or more, or seven of the aforementioned elements, in any combination. The precipitates comprising or containing one or more of the aforementioned elements may be present in the form of sulfides and/or oxides and/or carbides.

In some embodiments, the β-phase may be characterized by an octagonal shape, more specifically by an octagonal shape with sharp edges.

Without wishing to be bound by theory, it is believed that the aforementioned morphological properties favorably contribute to machinability by providing appropriately distributed brittle β-phases.

In some embodiments, the brass alloy may be characterized by a tensile strength of about 300 MPa to about 900 MPa, more specifically of about 400 MPa to 800 MPa, in particular of about 430 MPa to 770 MPa.

In some embodiments, the brass alloy may be characterized by a yield stress of about 100 MPa to about 900 MPa, more specifically of about 250 MPa to about 700 MPa, in particular of about 450 MPa to about 650 MPa.

In some embodiments, the brass alloy may be subjected to a thermal treatment at about 550° C. to about 700° C., more specifically of about 600° C. to about 650° C. The thermal treatment may adjust the morphology of the brass alloy.

In some embodiments, the thermal treatment may comprise a thermal treatment step in which the brass alloy is subjected to heat at a temperature of about 550° C. to about 700° C., more specifically of about 600° C. to about 650° C., for at least about 1 hour.

In some embodiments, the thermal treatment may comprise a thermal treatment step subsequent, if present, to a preceding thermal treatment step, in which the brass alloy is subjected to heat at a temperature of about 450° C. to about 600° C., more specifically of about 500° C. to about 550° C., for at least about 1 hour.

In some embodiments, the heat treatment may further comprise cooling of the brass alloy by quenching, more specifically by quenching with water. The quenching may decrease the grain size of the microstructure.

In a second aspect, the present disclosure relates to a handheld writing instrument for dispensing a solvent writing ink. The handheld writing instrument may comprise a tubular body and a tip. The tip may comprise a brass alloy as defined in any one of the embodiments for the first aspect of the present disclosure. The tip may be adapted to be coupled to the tubular body.

In some embodiments, the writing instrument may be a pen, more specifically a ball pen.

It should be understood that the embodiments referred to above with respect to the first aspect of the disclosure equally apply to and are combinable with the second aspect of the disclosure.

In a third aspect, the present disclosure relates to a process for preparing a tip according to the first aspect of the present disclosure. The process may comprise melt mixing a composition comprising the elements in amounts as indicated for the brass alloy according to the first aspect of the present disclosure. The process may further comprise extruding the melt to a solid body. The process may further comprise processing the solid body to a tip. In some embodiments, the composition and/or the properties of the obtained brass alloy may be defined as indicated above for the first aspect of the present disclosure.

In some embodiments, the melt-mixed composition may be melted at a temperature of at least about 800° C., more specifically of at least about 850° C., in particular of at least 890° C.

In some embodiments, the solid body may be a wire or a billet.

In some embodiments, the process may further comprise, subsequent to extruding the melt into a solid body, subjecting the solid body to a first thermal treatment step at a temperature of about 550° C. to about 700° C., more specifically of about 600° C. to about 650° C., in particular for at least about 1 hour.

In some embodiments, the process may further comprise, subsequent to the first thermal treatment step, subjecting the solid body to a second thermal treatment step at a temperature of about 450° C. to about 600° C., more specifically of about 500° C. to about 550° C., in particular for at least about 1 hour. In some embodiments, the second thermal treatment step may be an annealing treatment of the solid body.

In some embodiments, the solid body may be further cooled by quenching, more specifically by quenching with water. The quenching of the solid body may adjust the microstructure of the brass alloy, more specifically adjust the grain size and/or the acicular shape. In some embodiments, the water quenching may lead to a decreased grain size.

In some embodiments, processing the solid body to the tip may comprise cutting the wire and/or billet, and/or drawing the wire, more specifically wherein the wire drawing may be repeated one or more times during the one or more thermal treatments of the solid body. In some embodiments, processing the solid body to the tip may further comprise machining the tip and/or packaging the tip.

It should be understood that the embodiments referred to above with respect to the first aspect of the disclosure equally apply to and are combinable with the third aspect of the disclosure.

In a fourth aspect, the present disclosure relates to the use of a brass alloy for preparing a tip for a handheld writing instrument.

It should be understood that the embodiments referred to above with respect to the first aspect of the disclosure equally apply to and are combinable with the fourth aspect of the disclosure.

In the following the present disclosure will be further elaborated by way of an Example.

EXAMPLE

An number of ingots having the following chemical composition are conventionally prepared as established in the art. The process is not particularly limited and may comprise the following steps: The raw material is a wire. The wire is subjected to the thermal treatments as described above. The wire is cut by a machine in order to have blanks to supply the machining machine. Next, the machining machine is machining the blanks to the different drillings, shaping and geometries of the writing tip. Typically, the machining operation takes place in an oily environment to lubricate the tools. Consequently, a degreasing step is needed to remove the oil and material chips. After this step, the tip is packaged and ready to use (on an assembly line).

Alloy Composition 1:

| Element | Target value (wt.-%) |
|---|---|
| Cu | 57.00 |
| Sn | 0.30 |
| Fe | 0.25 |
| Si | 0.10 |
| Ni | 0.20 |
| Zn | as balance |

Alloy Composition 2:

| Element | Target value (wt.-%) |
|---|---|
| Cu | 57.00 |
| Sn | 0.30 |
| Fe | 0.25 |
| Si | 0.10 |
| Ni | 0.20 |
| Bi | 0.50 |
| Te | 0.10 |
| Se | 0.10 |
| Zn | as balance |

The alloy composition 2 was characterized by a morphology as shown in FIGS. 1, 2A and 2B. The α- and β-phases are evident and, as evident in FIG. 2B, the precipitates are accumulated at grain boundaries of the α- and β-phases.

The machinability of the brass alloy of both compositions is excellent, even though the brass alloy was substantially free of or free of Pb.

Although the preferred embodiments of the present disclosure have been disclosed for illustrative purposes, those skilled in the art will appreciate that various modifications and alterations are possible, without departing from the spirit of the present disclosure. It is also to be understood that such modifications and alterations are incorporated in the scope of the present disclosure and the accompanying claims.

The invention claimed is:

1. A tip for a handheld writing instrument, the tip comprising a brass alloy consisting essentially of:

Cu: in an amount of from about 52 wt.-% to about 62 wt.-%,

Sn: in an amount of from about 0.10 wt.-% to about 1.0 wt.-%,

Fe: in an amount of from about 0.10 wt.-% to about 1.0 wt.-%

Si: in an amount of from about 0.05 wt.-% to about 0.50 wt.-%,

Ni: in an amount of from about 0.05 wt.-% to about 0.50 wt.-%,

Bi: in an amount of from about 0.05 wt.-% to about 0.70 wt.-%,

Te: in an amount of from about 0.05 wt.-% to about 0.20 wt.-%,

Se: in an amount of from about 0.05 wt.-% to about 0.20 wt.-%,

Pb: if present, in an amount of less than about 0.05 wt.-%, and

Zn: as balance.

2. The tip according to claim 1, wherein the brass alloy contains less than about 0.03 wt.-% Pb.

3. The tip according to claim 1, wherein the brass alloy is substantially free of or free of Pb.

4. The tip according to claim 1, wherein the brass alloy contains at least about 35 wt.-% Zn.

5. The tip according to claim 1, wherein the brass alloy contains between about 40 wt.-% and about 44 wt.-% Zn.

6. The tip according to claim 1, wherein, in a cross-sectional cut of the tip, the brass alloy is characterized by a microstructure comprising acicular α-phases and acicular β-phases.

7. The tip according to claim 6, wherein the microstructure comprises domains in which a plurality of α-phases and a plurality of β-phases are alternatingly arranged.

8. The tip according to claim 6, wherein the microstructure comprises domains in which the α-phases and/or the β-phases have an aspect ratio of at least about 5.

9. The tip according to claim 6, wherein the microstructure comprises domains in which the α-phases and/or the β-phases have an aspect ratio of at least about 10.

10. The tip according to claim 6, wherein the microstructure comprises domains in which the α-phases and/or the β-phases have a length of at least about 50 μm.

11. The tip according to claim 6, wherein the β-phases of the microstructure occupy about 20 to about 55% by area.

12. The tip according to claim 6, wherein the β-phases are uniformly dispersed in the microstructure.

13. A handheld writing instrument for dispensing a solvent writing ink comprising:

a tubular body, and a tip according to claim 1, wherein the tip is adapted to be coupled to the tubular body.

14. A process of preparing the tip according to claim 1, comprising:

a) melt mixing a composition consisting essentially of:

Cu: in the amount of from about 52 wt.-% to about 62 wt.-%,

Sn: in the amount of from about 0.10 wt.-% to about 1.0 wt.-%,

Fe: in the amount of from about 0.10 wt.-% to about 1.0 wt.-%,

Si: in the amount of from about 0.05 wt.-% to about 0.50 wt.-%,

Ni: in the amount of from about 0.05 wt.-% to about 0.50 wt.-%,

Bi: in the amount of from about 0.05 wt.-% to about 0.70 wt.-%,

Te: in the amount of from about 0.05 wt.-% to about 0.20 wt.-%,

Se: in the amount of from about 0.05 wt.-% to about 0.20 wt.-%,

Pb: if present, in the amount of less than about 0.05 wt.-%; and

Zn: as balance, b) extruding the melt to a solid body, and c) processing the solid body to a tip.

15. The tip according to claim 1, wherein the brass alloy consists essentially of:

Cu: in an amount of from about 54 wt.-% to about 60 wt.-%,

Sn: in an amount of from about 0.25 wt.-% to about 0.35 wt.-%,

Fe: in an amount of from about 0.20 wt.-% to about 0.30 wt.-%,

Si: in an amount of from about 0.08 wt.-% to about 0.12 wt.-%, and

Ni: in an amount of from about 0.15 wt.-% to about 0.25 wt.-%.

* * * * *